March 6, 1973     E. MITTMAN     3,719,549
ABRADED SUEDE-LIKE SHEETING AND PROCESS FOR SAME
Filed Feb. 5, 1971     5 Sheets-Sheet 1
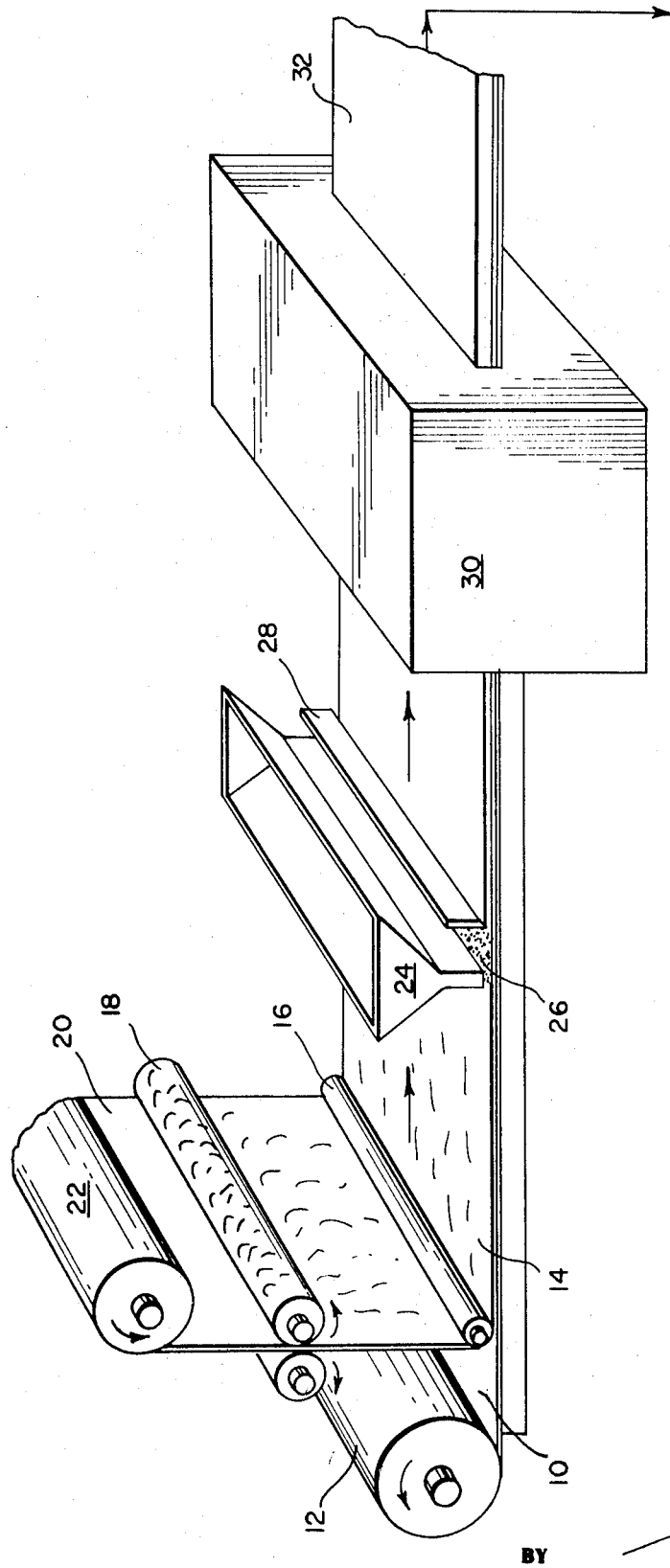
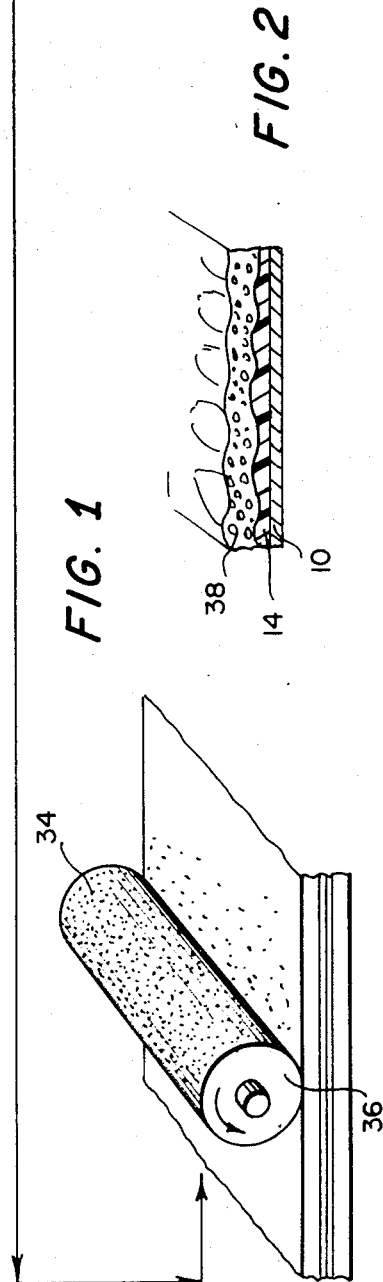
INVENTOR
EMANUEL MITTMAN
BY
ATTORNEY March 6, 1973 E. MITTMAN 3,719,549
ABRADED SUEDE-LIKE SHEETING AND PROCESS FOR SAME
Filed Feb. 5, 1971 5 Sheets-Sheet 2
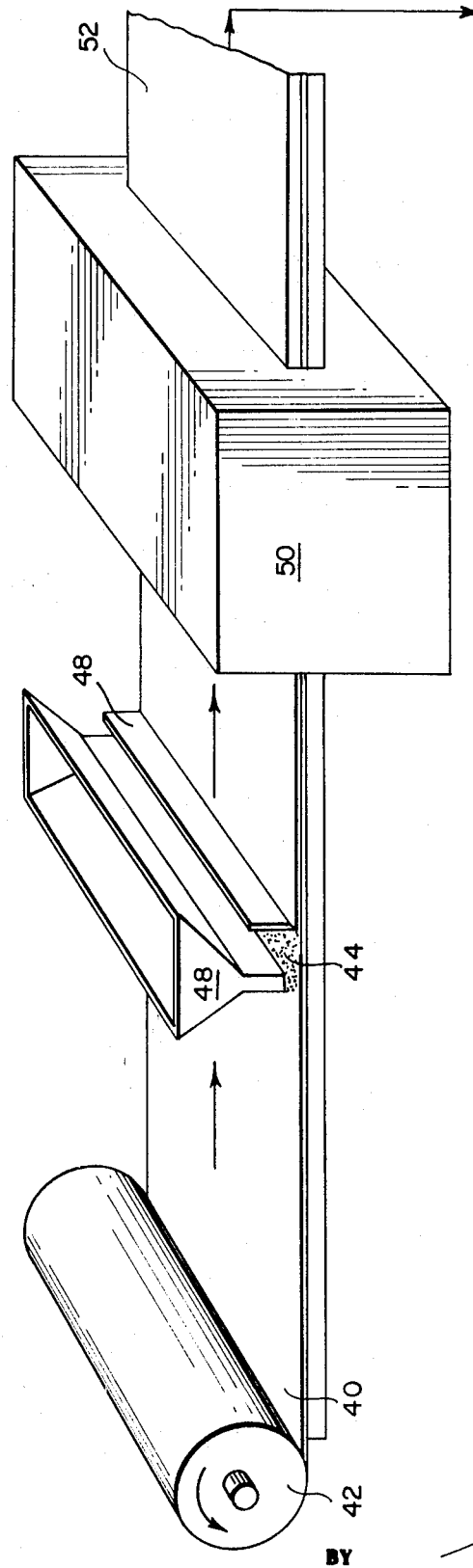
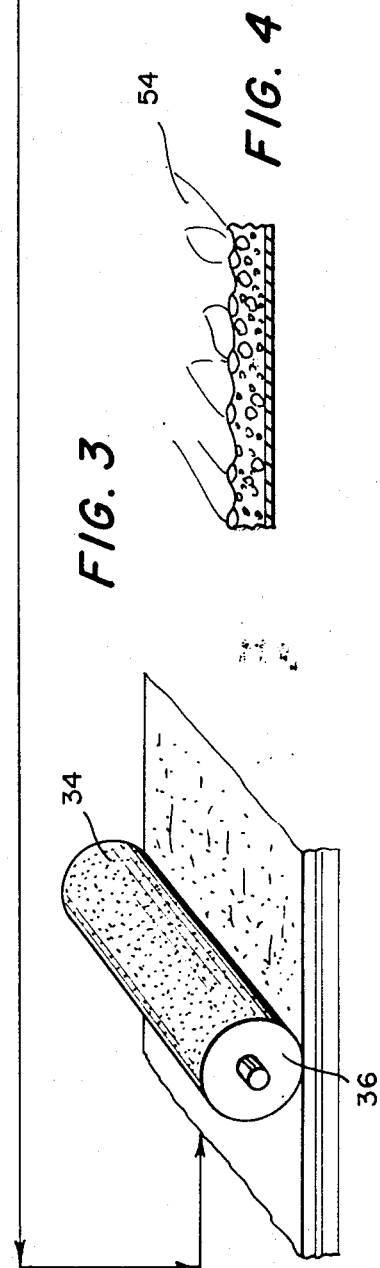
FIG. 3
FIG. 4
INVENTOR
EMANUEL MITTMAN
BY
ATTORNEY March 6, 1973 E. MITTMAN 3,719,549
ABRADED SUEDE-LIKE SHEETING AND PROCESS FOR SAME
Filed Feb. 5, 1971 5 Sheets-Sheet 3

INVENTOR
EMANUEL MITTMAN

March 6, 1973 E. MITTMAN 3,719,549
ABRADED SUEDE-LIKE SHEETING AND PROCESS FOR SAME
Filed Feb. 5, 1971 5 Sheets-Sheet 4
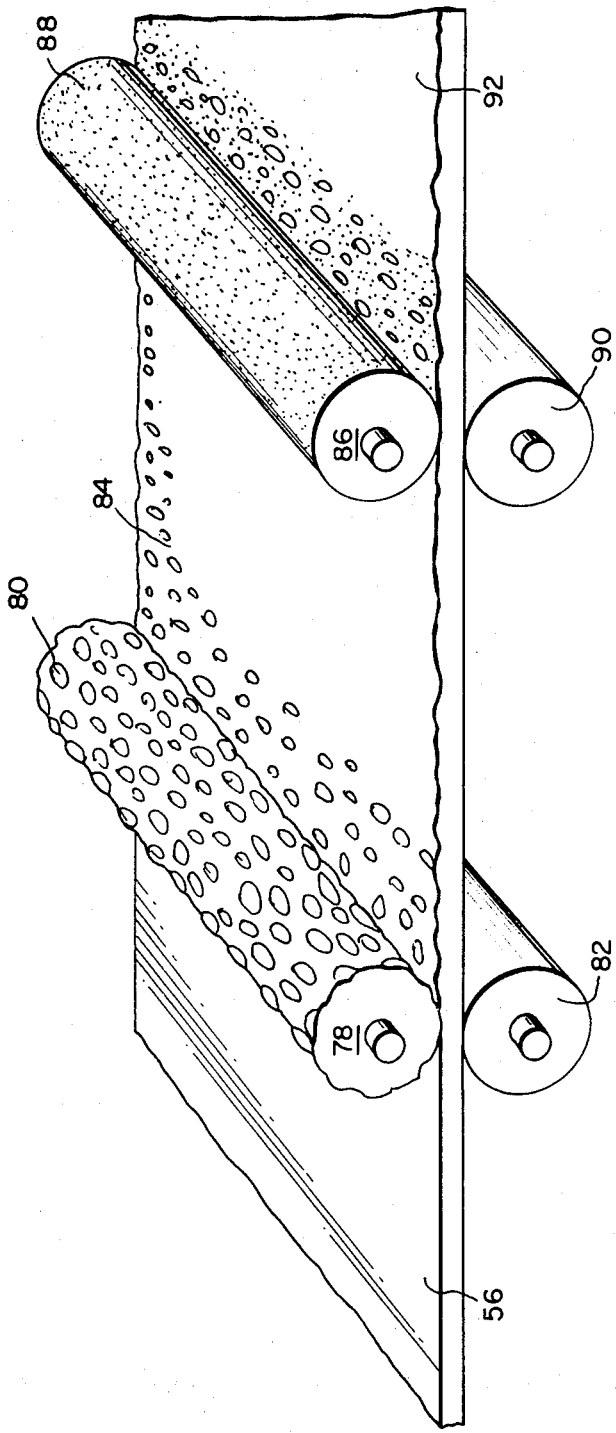
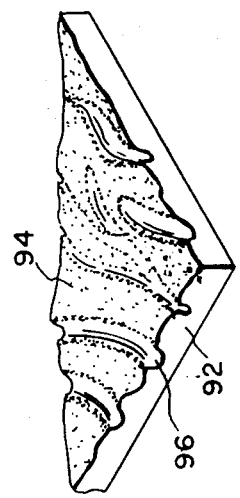
INVENTOR
EMANUEL MITTMAN
ATTORNEY March 6, 1973     E. MITTMAN     3,719,549
ABRADED SUEDE-LIKE SHEETING AND PROCESS FOR SAME
Filed Feb. 5, 1971     5 Sheets-Sheet 5
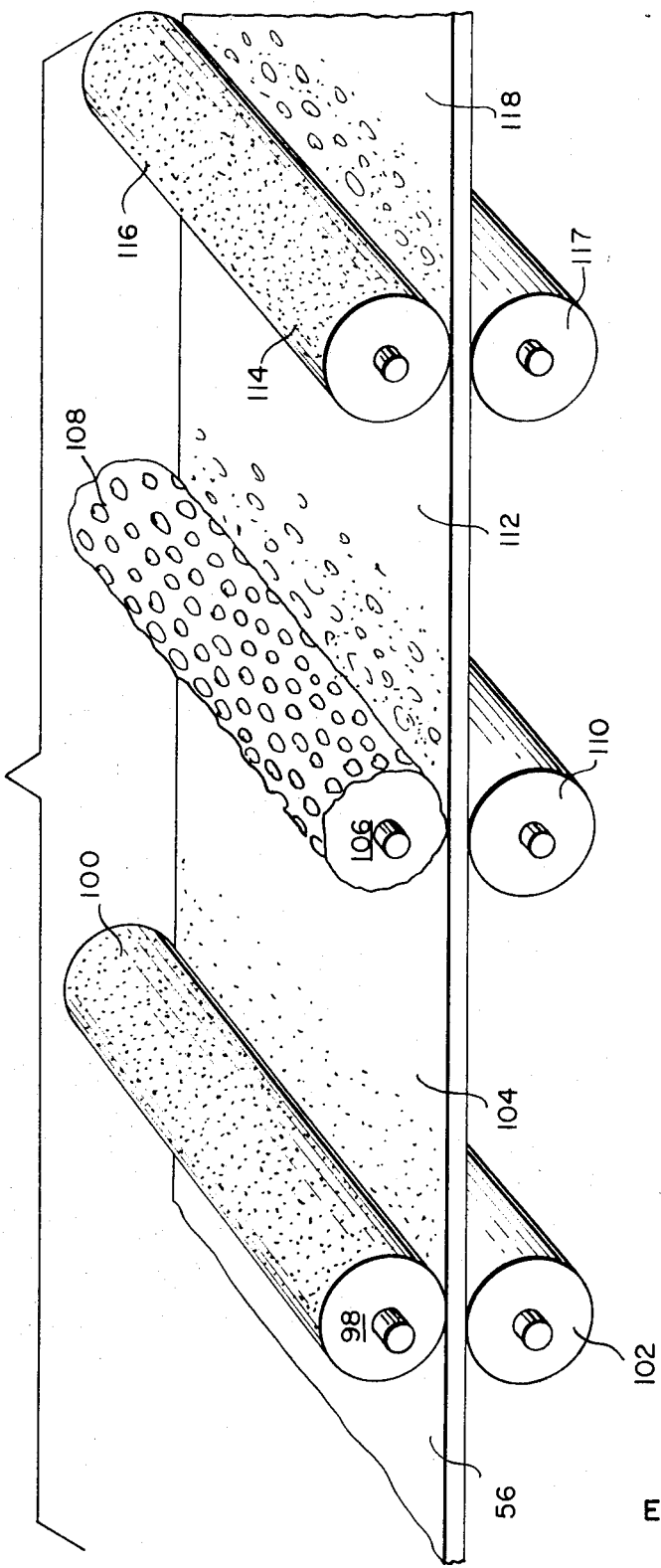
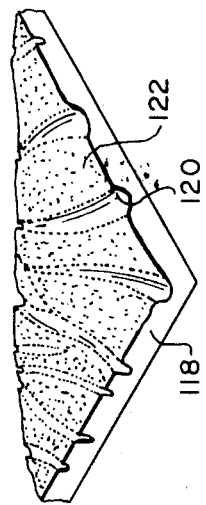
INVENTOR
EMANUEL MITTMAN
BY
ATTORNEY United States Patent Office
3,719,549
Patented Mar. 6, 1973

3,719,549
ABRADED SUEDE-LIKE SHEETING AND
PROCESS FOR SAME
Emmanuel Mittman, Forest Hills, N.Y., assignor to
W. R. Grace & Co., New York, N.Y.
Filed Feb. 5, 1971, Ser. No. 112,899
Int. Cl. B32b 3/00, 31/00
U.S. Cl. 161—119  8 Claims

ABSTRACT OF THE DISCLOSURE

The invention disclosed is for preparation of a new suede-like plastic sheeting having a desirably configurated surface which provides an improvement in the surface textural characteristic thereof.

---

This invention relates to a method for preparing a new suede-like plastic sheeting having a desirably configurated surface which provides an improvement in the surface textural characteristics of the sheeting.

It is well known in the art, such as is disclosed in U.S. Pat. No. 3,041,193 and U.S. Pat. No. 3,312,586, that artificial suede may be prepared from plastic sheeting. Typically, these methods are directed to providing nonconfigurated suede-like surfaces by first spreading a layer of foamable thermoplastic resin onto a textile fabric backing sheet, after which the resin is foamed and the surface thereof abraded to create the suede-like appearance. The art heretofore has recognized problems with a striking through phenomena whereby the undesirable appearance of the backing sheet telescopes through the foam resin, and as disclosed by Barlow in U.S. Pat. No. 3,312,586, efforts were made to inhibit such striking through of the resin coating. It has now been found, however, that by practice of the present invention, a desirably configurated surface is created which provides an improvement in the surface textural characteristics of the sheeting. The present invention results by recognition of advantages which accrue by usefully employing rather than eliminating, benefits of the striking through phenomena.

Generally stated, the method of the present invention provides means for imparting a desirably configurated surface to suede-like plastic sheeting.

In one embodiment of the present invention, a desirably configurated suede-like plastic sheeting is prepared by surface abrading a lamination formed of a support layer, a desirably contoured intermediate layer, and a foamed plastic surface layer. During the abrading step, the configuration of the desirably contoured intermediate layer telescopes through the foamed plastic surface layer and becomes part of the suede-like surface after abrading.

In another embodiment hereof, a configurated suede-like plastic sheeting is prepared by first abrading the surface of a foamed plastic sheeting, having non-telescoping lower layers, then embossing a desirable configuration into the abraded surface, and finally lightly re-abrading the configurated surface to provide the finally configurated suede-like sheeting.

In another embodiment of the present invention, a configurated suede-like plastic sheeting is prepared by abrading the surface of foamed plastic sheeting wherein the numerous voids forming the foam are greatly varied. The great variations in the size of the foam voids provides the surface configurations after the abrading step.

In another embodiment, a configurated suede-like plastic sheeting is prepared by simultaneously abrading the surface of a foamed plastic sheeting while embossing a configuration into the bottom surface forming the sheeting. In this embodiment, the embossed configuration telescopes through the body of the sheeting and becomes part of the suede-like surface which results.

In yet another embodiment hereof, a sheet of foamed plastic is first surface embossed with a desired configuration and thereafter the embossed sheeting is surface abraded. The sheeting which results is characterized by high surface areas having a suede-like appearance and lower surface areas having a smooth non-suede-like appearance. This contrast of sueded hills and smooth valley areas accentuates the desirable configuration of the resulting product, and is especially vivid when the non-sueded areas are illuminated by a wet or shining reflective surface.

It is recognized that numerous additional embodiments of the present invention will be readily provided simply by varying the basic steps featured in the embodiments previously noted.

The present invention is more fully illustrated with reference to the drawings herein:

FIG. 1 illustrates as a perspective view preparation of a suede-like plastic sheeting having an intermediate contoured layer;

FIG. 2 illustrates the suede-like plastic sheeting prepared thereby;

FIG. 3 illustrates as a perspective view preparation of a plastic sheeting without using an intermediate contoured layer;

Figure 5:
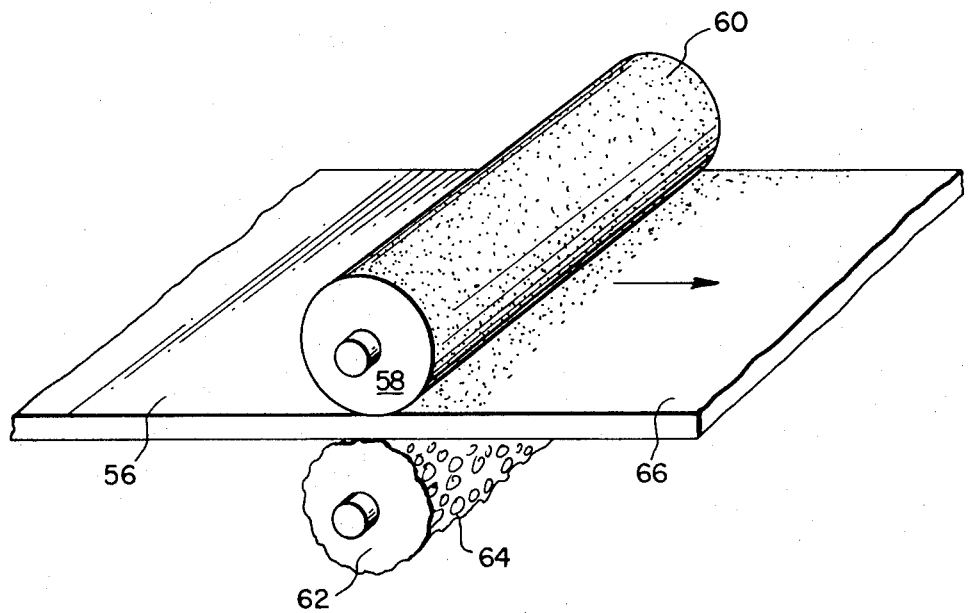
Figure 6:
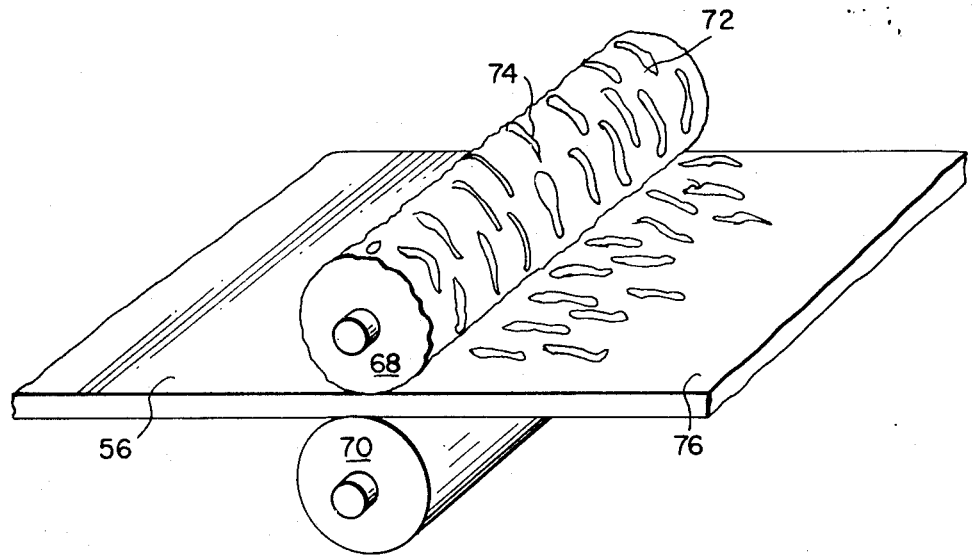

FIG. 4 diagrammatically illustrates in partial perspective view a product prepared by the procedure of FIG. 3 wherein highly variable sized voids form the surface configuration;

FIG. 5 illustrates simultaneous abrading and bottom surface embossing;

FIG. 6 illustrates simultaneous embossing and abrading of plastic sheeting;

FIG. 7 illustrates embossing followed by abrading;

FIG. 8 illustrates in partial perspective view the product prepared using the sequence of FIG. 7;

FIG. 9 illustrates sequential abrading following by embossing and subsequently re-abrading of plastic sheeting;

And FIG. 10 diagrammatically illustrates in partial perspective the plastic sheeting prepared by the sequence of FIG. 9.

Referring to the drawings wherein similar elements are referred to by similar numerals throughout the several views, FIG. 1 illustrates one embodiment for preparing a new suede-like plastic sheeting by the present invention. Fibrous backing material 10 is received from roll 12 and is laminated by intermediate configurated layer 14 by pressure of roll 16 with or without addition of suitable adhesives as desired. The backing material may be formed of most any fibers with cotton containing fibers being preferred for economical and structural reasons. The intermediate contoured layer 14 may receive desirable configuration by conventional embossing using, for example, embossing rolls 18 which emboss a pattern into sheeting 20 received from roll 22. The intermediate configured surface desirably appears with a leather-like configuration of sufficient depth to telescope through the prepared product and process the configuration on the finished surface thereof. Intermediate layer 14 may receive a plastic material from hopper 24 with the plastic appearing as a plastisol composition 26 containing in addition to the plastic a suitable foaming agent and additional materials as desired. The plastisol composition is layered by doctor blade 28 to provide a substantially uniform surface. The layered material is passed through a heating unit 30 wherein the plastisol layer is heated to cause release of gas by the blowing agent with the formation of a cellular upper layer 32 having a substantially uniform smooth surface. After being cooled, the lamination 32 passes beneath abraded roll 34 desirably formed of a sand paper type surface disposed about a hard rubber roll 36. Other abraded surfaces may be used as desired with roll 36 being rolled in either a clockwise or counterclockwise fashion as desired to effectuate abrading of the smooth surface of laminate 32. The abrading pressure of roll 36 on lamination 32 accomplishes abrading of the surface and in addition telescoping of the desirably configurated pattern on intermediate layer 14 through the upper foam layer 38 illustrated in FIG. 2. Accordingly, the abrading operation results in the telescoping of, for example, a leather-like appearance from intermediate layer 14 through the upper layer of foamed resin thereby complimenting the suede-like surface appearance with a leather-like textural characteristic. FIG. 3 illustrates an embodiment for preparing a configurated suede-like plastic sheeting. Fibrous backing material 40 taken from roll 42 directly receives a plastisol composition 44 from hopper 46 with the composition being substantially uniformly layered by blade 48 prior to heating in oven 50 to effect foaming. Foamed lamination 52 received from oven 50 is permitted to cool prior to be surface abraded passing under sanding surface 34 on roll 36. The product having a configurated surface resulting from the operation of FIG. 3 diagrammatically appears in FIG. 4 by employing a foaming agent of variable particle sizes in plastisol composition 44. The foamed upper layer 54 is found to include cells of greatly varied sizes such that by removing the upper surface by abrading there is provided a configurated surface which results by the great variation in open cell sizes forming the foam.

FIG. 5 illustrates a means for effecting surface configuration into plastic sheeting 56 having a foamed resin surface. The resin sheeting 56 may or may not be laminated as desired. Sheeting 56 is illustrated as being abraded by roll 58 having a sand paper type surface 60 while being embossed simultaneously by roll 62 having an embossed surface 64 thereon. The abraded product 66 received in FIG. 5 is simultaneously abraded and embossed with a configurated surface projecting from the bottom surface of the sheet by means of embossing roll 62.

FIG. 6 illustrates another method for processing sheeting 56 between rolls 68 and 70. Roll 68 includes a sand paper type surface 72 which is complemented by an embossing configuration formed on the abrading surface. Roll 70 appears as a hard rubber roll sufficient to receive the simultaneous abrading and embossing imparted by the surface of roll 68 into sheeting 56. The resulting product of this operation appears as configurated suede-like plastic sheeting 76.

FIG. 7 further illustrates a method for processing plastic sheeting 56. In this method, the sheeting is processed at an embossing location formed by roll 78 having embossed surface 80 thereon with co-action of hard rubber roll 82. Sheeting 84 having, for example, a leather appearance embossed thereon is next processed by abrading stage formed of roll 86 having a sand paper abrading surface 88 thereon which operates in conjunction with rubber roll 90. The resulting sheeting 92 is illustrated in greater detail in FIG. 8 wherein suede-like hills 94 are present and which are accentuated by non-suede-like embossed valleys 96. In this method, plastic sheeting 56 may be coated prior to the embossing operation such that the plastic has a slippery or wet appearance. After the abrading operation, and depending upon the particular color of the coating material, production sheeting 92 may have a marbleized appearance formed of valleys of one color with the suede-like hills formed of an alternate color, i.e., the color of the abraded foam.

FIG. 9 illustrates another method for desirably configurating the surface of plastic sheeting. In this operation, plastic sheeting 56 is first passed through an abrading location formed of roll 98 having a sand paper type abrading surface 100 thereabout in conjunction with rubber roll 102. The sheeting resulting from this operation appears as a suede-like plastic 104 which then passes to an embossing location formed of embossing roll 106 having embossing surface 108 which operates in conjunction with rubber roll 110. The sheeting resulting from the embossing operation generally appears as sheeting 112 which includes an effectively embossed configuration and a slightly imperfected suede-like appearance. Sheeting 112 is next passed under re-abrading roll 114 having a mild sanding surface 116 which improves the suede-like appearance of the embossed surface. The resulting product 118 is illustrated diagrammatically in FIG. 10 wherein the valley embossed areas 120 have a suede-like configuration as well as the hill areas 122.

Conveniently, the plastic material processed by the present invention includes compositions formed of polyurethane, polyvinyl chloride, polyolefins such as polyethylene and polypropylene, styrene/acrylonitrile. The plastic layer may also be formed of polyvinylidene chloride, vinyl chloride vinyl acetate copolymers, vinylchloride-vinylidene chloride copolymers, and mixtures of the above. Other suitable polymers are copolymers of vinyl chloride or other vinyl halides with monomers such as vinyl acetate, vinylidene chloride diethyl maleate, and vinyl-acetals such as vinyl butyral chloride and the like. The plastic composition may also include a suitable blowing agent such that those conventionally used in preparing foamed structures. Examples of suitable blowing agents include compositions such as p,p'-oxybis-benzene sulfonyl hydrazide, naphthalene-1,5-disulfonyl hydrazide, diazominobenzene, azodicarbonamide, biuret, di-n-nitrosopentamethylenetetramine, N,N' - dimethyl N,N'-dinitroso terephthalamide, sodium carbonate, ammonium carbonate, and ammonium bicarbonate. Other well known blowing agents, or introduction of a gas such as air may also be employed as desired.

Blowing agents which produce predominately open-cell foamed structures are desirably employed herein since the resulting structure is generally breathable. When closed-cell foams result, additional means may be required to render the composition breathable such as by penetrating the foam with pins or the like. Numerous other methods for rendering closed-cell foam layers breathable are known to the art and may be employed.

The plastic composition may include additional materials such as suitable plasticizers, heat or light stabilizers, waxes, flame retardants, bodying agents, accelerators, lubricants, colors and volatile solvents as desired.

The sheeting may be abraded by a number of precision surface abrading means such as by use of high speed wheels, drums, or belts having surfaces of sandpaper, emery cloth, silicon carbide or the like. The speed and pressure of the abrading apparatus, as well as that of the embossing apparatus hereof may vary greatly and is readily determined for particular materials being processed. Accordingly, these parameters are readily determinable under operating conditions.

Using the present invention, various novel sueding processes are readily effected. Particularly, low profile sueding is readily effected wherein the grooves of an embossed or corduroyed material can be sueded rather than the high points. Also, both high and low profile surfaces are readily sueded as may be desired to obtain a particular effect. Pantographic techniques with or without masking may also be used to provide specific effects such as heavier and lighter sueding, decorative designs and the like.

The support sheeting or backing although desirably formed of cotton may also be formed of rayon fabric, felt, paper, jute, silk, and a rayon fabric mixture with a high strength synthetic fiber such as nylon or Dacron. A suitable supporting material may be glass fibers, kraft paper, crepe paper, rubber saturated paper or flannels, or a release paper which may be a wax-coated paper for easy stripping from the foam layer once it is made.

The support sheeting on which the polymeric coating is applied may be woven, knitted, braided, twisted, nonwoven or the like, natural, that is, animal, vegetable and mineral fibers or synthetic fibers or mixtures thereof. Polyester, polyamide, polyethylene, polypropylene, polyurethane, polyvinyls and the like fibers may be used as well as cellulose based substrates. If desired, the fibrous material may be laminated with other fibrous materials or with a synthetic plastic sheet material. Combinations of these various materials may also be employed as the backing material. The thickness of the backing is generally not critical and typically is in the range of about 0.005 to about 0.1 inch.

The thickness of the foamed layer may vary and is conveniently about 0.005 to 0.05 inch although it may be less than 0.005 and as great as .1 to .2 inch, or even 1 to 2 inches or more.

The intermediate layer is desirably formed of plastic which may be readily embossed and which effectively retains the embossing. Conveniently, thermoplastic materials are desirable for use as the intermediate layer. The thickness of the intermediate layer is sufficient to retain the embossing and is thereby regulated by the material employed. Typically, a thickness of thermoplastic material from about 0.005 to about 0.05 inch is sufficient.

It is recognized that the invention described includes embossing locations which may require prior heating means to effect embossing. These heating means although not illustrated are well known to the art of embossing and may be applied hereto as desired. Also, to more effectively abrade the foam plastic, it may be necessary and desirable to cool the foamed structure prior to abrading. Accordingly, it may be necessary to provide heating and cooling means between the processing steps of embossing and abrading in commercial application of the present invention. Because these techniques are well known to the art, they are not described in detail herein.

Preferred embodiment of the present invention has been described and accordingly it will be appreciated that numerous modifications may be made without departing from the present invention as defined.

What is claimed is:

1. A suede-like plastic sheet comprising a foamed organic plastic layer of substantially uniform thickness one surface of which bears an embossed pattern and the opposite surface of which is abraded to a depth sufficient to expose the foam cells adjacent to said abraded surface and at which at least a portion of the embossed pattern telescopes through to the said abraded surface.

2. Product as defined in claim 1 further including a backing layer laminated to the embossed surface of the said foam layer.

3. Product as defined in claim 1 in which the embossed pattern is provided by a separate embossed layer laminated to a surface of said foam layer.

4. Product as defined in claim 3 further including a backing layer laminated to said embossed layer on the surface opposite the said foam layer.

5. A suede-like plastic sheet comprising a plastic foamed organic layer of substantially uniform thickness one surface of which bears an embossed pattern and is also abraded in the unembossed areas to a depth sufficient to expose the foam cells adjacent thereto but less than the depth of the embossed pattern, thereby providing a product with non-abraded valleys and abraded hill surface areas.

6. A method for imparting a desirably configurated surface to suede-like organic plastic sheeting which comprises:
   (a) laminating an embossed sheet onto a backing sheet;
   (b) disposing plastisol composition containing a foaming agent onto the embossed sheet;
   (c) heat foaming the plastisol composition to form a foamed organic plastic layer-embossing layer-backing layer lamination; and
   (d) surface abrading the foam layer to a depth sufficient to provide a suede-like surface having a contoured effect received from telescoping through to the abraded surface of the embossed pattern provided by the embossed intermediate layer.

7. A method for imparting a desirably configurated surface to suede-like organic plastic sheeting which comprises embossing a surface of a foamed organic plastic sheet while simultaneously surface abrading the surface opposite that being embossed to a depth at which at least a portion of the embossed pattern telescopes through to the abraded surface.

8. A method for imparting a desirably configurated surface to suede-like organic plastic sheeting which comprises embossing a desired pattern in the surface of a foamed organic plastic sheet and thereafter abrading the surface in unembossed areas to a depth sufficient to expose the foam cells adjacent thereto but less than the depth of the embossed pattern to provide a product characterized with non-abraded valleys and abraded hill surface areas.

References Cited

UNITED STATES PATENTS

| | | | |
|---|---|---|---|
| 3,041,193 | 6/1962 | Hamway et al. | 156—244 |
| 3,239,365 | 3/1966 | Petry | 161—Dig. 3 |
| 3,312,586 | 4/1967 | Barlow | 161—159 |
| 3,575,754 | 4/1971 | Duerden et al. | 156—78 |
| 3,284,274 | 11/1966 | Hulslander et al. | 161—159 |
| 3,660,218 | 5/1972 | Shepherd et al. | 161—164 |

WILLIAM J. VAN BALEN, Primary Examiner

U.S. Cl. X.R.

117—11; 156—153, 154, 209; 161—159, 164, 165, 190, 247, Digest 2, Digest 3